(12) United States Patent
Garcia et al.

(10) Patent No.: US 6,433,785 B1
(45) Date of Patent: Aug. 13, 2002

(54) METHOD AND APPARATUS FOR IMPROVING PROCESSOR TO GRAPHICS DEVICE THROUGHPUT

(75) Inventors: Serafin E. Garcia, Folsom; Russell W. Dyer, El Dorado Hills, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/288,878

(22) Filed: Apr. 9, 1999

(51) Int. Cl.[7] .............................................. G06F 13/16
(52) U.S. Cl. ....................... 345/531; 345/534; 345/537; 710/305
(58) Field of Search ................................ 345/501–503, 345/520, 531, 558, 534, 537; 710/36, 100, 112, 129, 305; 712/215, 248

(56) References Cited

U.S. PATENT DOCUMENTS

| | | | | |
|---|---|---|---|---|
| 5,682,551 A | * | 10/1997 | Pawlowski et al. | 710/36 |
| 5,758,166 A | * | 5/1998 | Ajanovic | 710/240 |
| 5,931,932 A | * | 8/1999 | Kanekal | 710/113 |
| 6,021,473 A | * | 2/2000 | Davis et al. | 711/141 |
| 6,104,417 A | * | 8/2000 | Nielsen et al. | 345/521 |
| 6,157,397 A | * | 12/2000 | Bogin et al. | 345/511 |
| 6,247,102 B1 | * | 6/2001 | Chin et al. | 711/150 |
| 6,260,123 B1 | * | 7/2001 | Strongin et al. | 711/158 |
| 6,279,087 B1 | * | 8/2001 | Melo et al. | |

* cited by examiner

Primary Examiner—Ulka Chauhan
(74) Attorney, Agent, or Firm—Calvin E. Wells

(57) ABSTRACT

An embodiment of a memory controller that improves processor to graphics device throughput by reducing the frequency of retries of postable write transaction requests is disclosed. The memory controller includes a posted write buffer and a timeout counter. The memory controller is coupled to a processor via a host bus and is also coupled to a graphics device via a graphics bus. If the posted write buffer is unavailable when a first postable write transaction request is received by the memory controller, the memory controller stalls the host bus and waits for the posted write buffer to become available. If a second transaction request is received while the posted write buffers are unavailable, the timeout counter is initiated. If the posted write buffer becomes available before the timeout counter expires, the first postable write transaction request is completed. If, however, the timeout counter expires before the posted write buffer becomes available, the memory controller issues a retry response to the processor, indicating to the processor that the first postable write transaction request must be reissued at a later time.

17 Claims, 3 Drawing Sheets

METHOD AND APPARATUS FOR IMPROVING PROCESSOR TO GRAPHICS DEVICE THROUGHPUT

FIELD OF THE INVENTION

The present invention pertains to the field of computer systems. More particularly, this invention pertains to the field of performing write transactions from a processor to a graphics device.

BACKGROUND OF THE INVENTION

The performance of a graphics subsystem within a computer system depends in large part on the amount of data a processor can deliver to a graphics device in a given period of time (throughput). In order for data to reach the graphics device, the data typically must be delivered from the processor to a memory controller over a host bus and then from the memory controller to the graphics device over a graphics bus.

The overall throughput from the processor to the graphics device depends on a number of factors, including data transfer rates from the processor to the memory controller. In order to achieve data transfer rates that approach the maximum possible transfer rates, the memory controller typically includes posted write buffers to receive postable data from the processor. Postable data refers to data that may be received by a system device, such as the memory controller, and later passed on to the final recipient of the data. The processor receives notice that the transaction is complete once the memory controller accepts the data. As long as the posted write buffer is available to accept data, the processor can deliver graphics data to the memory controller at rates approaching the maximum possible rates.

When writing data to the graphics device, the processor will typically attempt to perform multiple sequential write transactions to contiguous addresses. In order to maximize data transfer rates between the memory controller and the graphics device, the memory controller may combine these multiple write transactions into longer burst write transactions. Graphics busses such as the accelerated graphics port (AGP) bus support such burst transactions.

In prior computer systems such as the one described, system performance is degraded when the processor issues a postable write transaction request but the memory controller is not able to receive the postable data associated with the postable write transaction request due to unavailability of the posted write buffers. The posted write buffers may become unavailable due to a number of reasons, including the posted write buffers not being able to drain quickly enough when transferring data from the posted write buffers to the graphics bus interface. Other memory controller activities may also impede the draining of the posted write buffers.

When a postable write transaction request cannot immediately be completed by the memory controller due to unavailability of the posted write buffers, prior memory controllers may stall the host bus until the posted write buffers become available. When a second transaction request is issued by the processor, or another host bus agent, and is received by the memory controller while the postable write transaction request is pending, the memory controller may "retry" the postable write transaction request in order to service the second transaction request. The "retry" response from the memory controller to the processor indicates to the processor that the postable write transaction request must be reissued at a later time.

Frequent retrying of postable write transaction requests can degrade graphics subsystem performance in a couple of different ways. Because a retried transaction request will need to be reissued by the processor, frequent retries will increase the overhead of performing postable write transactions. Also, because retried postable write transaction requests may be completed in a different order than originally requested, the memory controller may not be able to combine multiple out-of-order postable write transactions into longer, more efficient, burst transactions over the graphics bus.

SUMMARY OF THE INVENTION

A method and apparatus for improving throughput from a processor to a device is disclosed. The apparatus includes a bus interface unit to receive a first postable write transaction request and a posted write buffer coupled to the bus interface unit to receive data associated with the first postable write transaction request. The apparatus also includes a timeout counter coupled to the bus interface unit. The bus interface unit initiates the timeout counter if the bus interface unit is currently unable to complete the first postable write transaction request due to unavailability of the posted write buffer and if a second transaction request is received. The bus interface unit issues a retry response to the first posted write transaction request upon an expiration of the timeout counter if the posted write buffer remains unavailable.

BRIEF DESCRIPTION OF THE DRAWINGS

The invention is illustrated by way of example and not limitation in the figures of the accompanying drawings, in which like references indicate similar elements, and in which.

DETAILED DESCRIPTION

An embodiment of a memory controller that reduces the frequency of retries of postable write transaction requests from a processor to a graphics device is disclosed. The memory controller includes a posted write buffer and a timeout counter. The memory controller is coupled to a processor via a host bus and is also coupled to a graphics device via a graphics bus. If the posted write buffer is unavailable when a postable write transaction request is received by the memory controller, the memory controller stalls the host bus and waits for the posted write buffer to become available. If a second transaction request is received while the posted write buffers are unavailable, the timeout counter is initiated. If the posted write buffer becomes available before the timeout counter expires, the postable write transaction request is completed. If, however, the timeout counter expires before the posted write buffer becomes available, the memory controller issues a retry response to the processor, indicating to the processor that the postable write transaction request must be reissued at a later time.

As a result, the embodiment reduces the frequency of retries of postable write transaction requests by providing for a grace period after the second transaction request is received before retrying the postable write transaction request due to unavailability of the posted write buffer. The reduction in retries can result in a reduction in overhead when performing multiple postable write transactions from a the processor to the memory device and can also result in keeping the multiple transactions in the originally intended order, thereby allowing the memory controller to combine multiple write transactions into longer burst transactions when delivering data to the graphics device over the graphics bus.

Figure 1:
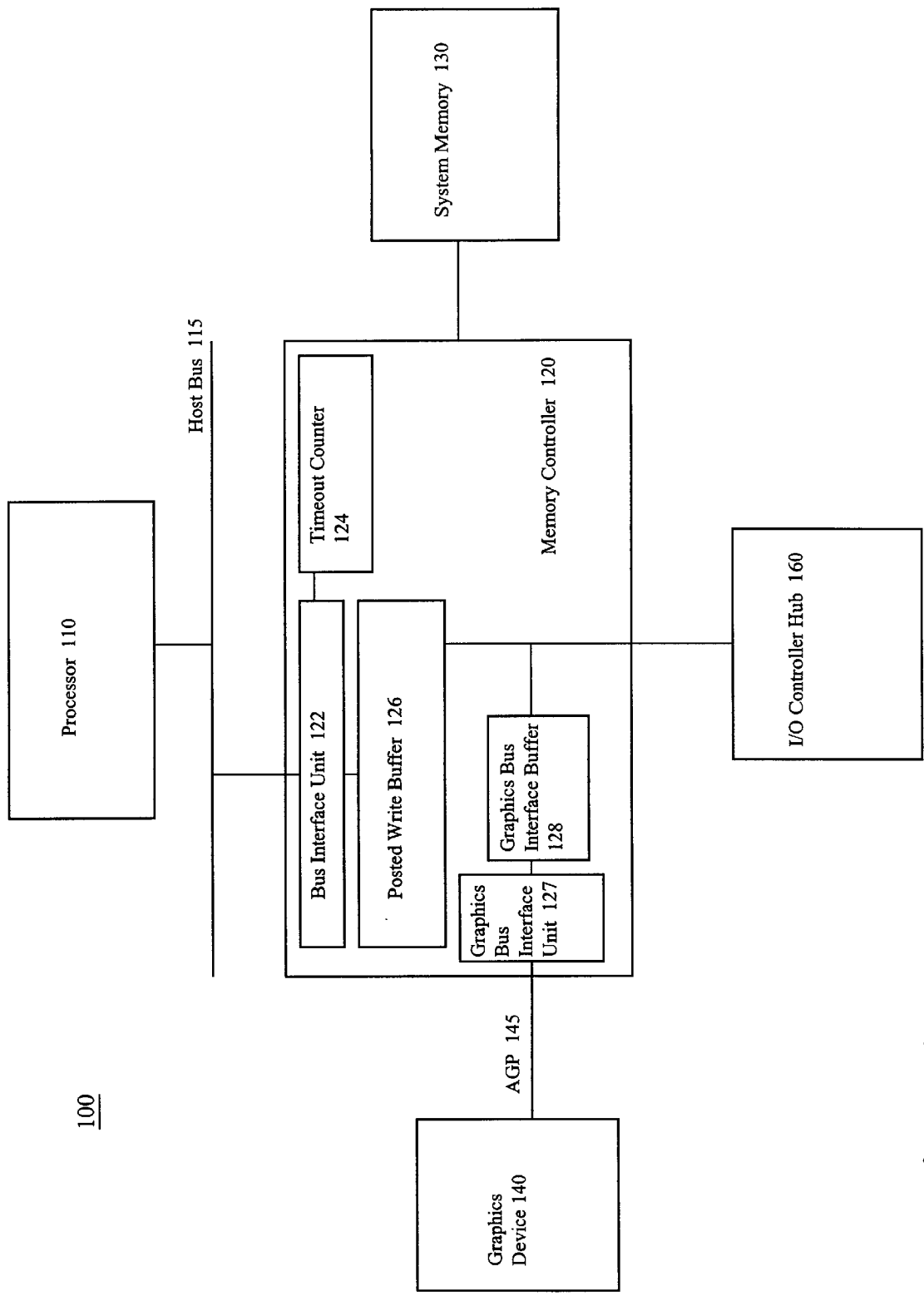
FIG. 1 is a block diagram of computer system including one embodiment of a memory controller with a posted write buffer and a timeout counter.

FIG. 1 is a block diagram of computer system 100 including one embodiment of a memory controller 120 with a posted write buffer 126 and a timeout counter 124. In one embodiment, the posted write buffer 126 is capable of storing three 32 byte lines of data, although alternative embodiments may use different buffer sizes. The term "counter" as used herein is meant to include a broad range of mechanisms for tracking a period of time. The system 100 also includes a processor 110 coupled to the memory controller 120 via a host bus 115, a system memory 130 coupled to the memory controller 120, an input/output controller hub 160 coupled to the memory controller 120, and a graphics device 140 coupled to the memory controller 120 via an AGP bus 145.

In addition to the posted write buffer 126 and the timeout counter 124, the memory controller 120 includes a bus interface unit 122 for coupling the memory controller 120 to the host bus 115, a graphics bus interface unit 127 for coupling the memory controller 120 to the AGP bus 145, and a graphics bus interface buffer 128. The graphics bus interface buffer receives data destined for the AGP bus 145 from the posted write buffer 126. The graphics interface unit 127 performs the task of delivering the data stored in the graphics bus interface buffer 128 to the graphics device 140 over the AGP bus 145.

When the processor 110 initiates a transaction to write data to the graphics device 140, it issues a first postable write transaction request. Although this embodiment discusses a transaction request to write data to a graphics device, other transaction requests are possible, including, but not limited to, postable write transaction requests to storage devices or communications devices. The first postable write transaction request is received by the bus interface unit 122. If the posted write buffer 126 is unavailable when the first postable write transaction request is received by the bus interface unit 122, the bus interface unit 122 stalls the host bus and waits for the posted write buffer 126 to become available. In one embodiment, the bus interface unit 122 uses a "snoop stall" mechanism to stall the host bus 115. A "snoop stall" refers to delaying the issuance of snoop results from the memory controller 120 to the processor 110 for the first posted write transaction request. While one embodiment uses the snoop stall mechanism to stall the host bus 115, alternative embodiments may use other methods or techniques for delaying the response to a postable write transaction request.

During the period of time when the response to the first postable write transaction request is being delayed via the snoop stall mechanism, it is possible for the memory controller 120 to receive a second transaction request from the processor 110 or from another bus agent (not shown). If the second transaction request is received while the posted write buffer 126 is unavailable, the timeout counter 124 is initiated. In one embodiment, the timeout counter 124 counts six periods of a host bus clock before expiring. Other embodiments may use other clock signals as a reference, or may count different numbers of clock periods before expiring. The number of clock periods to be counted before expiring may also be programmable. The terms "expired" or "expiring" as used herein are meant to include any method or mechanism for indicating that a predetermined number of clock periods has passed or that a predetermined period of time has elapsed.

If the posted write buffer 126 becomes available before the timeout counter 124 expires, the first postable write transaction request is completed, meaning that the data associated with the first postable write transaction request is stored in the posted write buffer 126 and a completion response is delivered from the memory controller 120 to the processor 110. If, however, the timeout counter 124 expires before the posted write buffer 126 becomes available, the bus interface unit 122 issues a retry response to the processor 110, indicating to the processor 110 that the first postable write transaction request must be reissued by the processor 110 at a later time. The functions of various embodiments of the memory controller 120 will be further explained below in connection with FIGS. 2 through 4.

Figure 2:
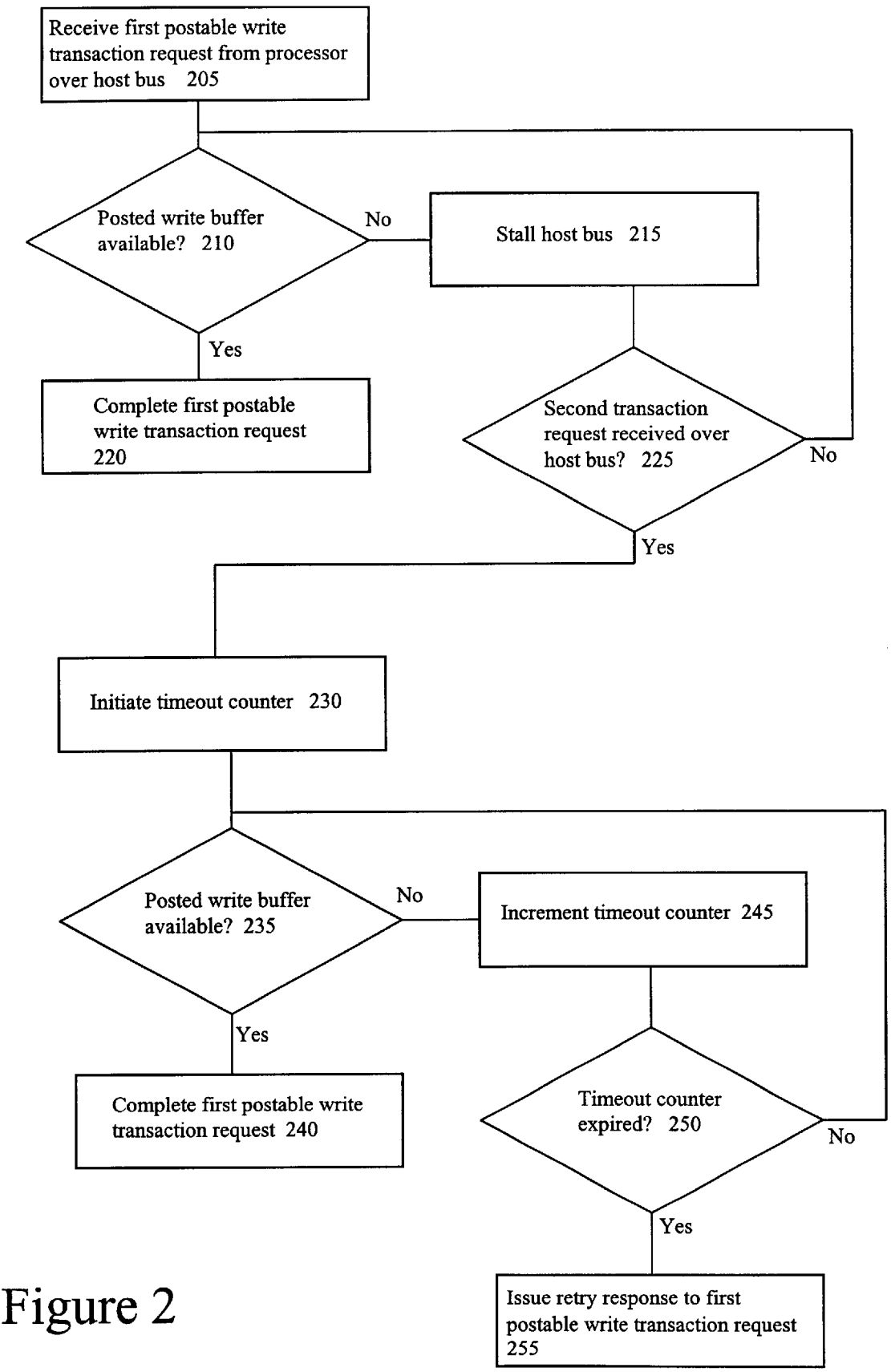
FIG. 2 is a flow diagram of one embodiment of a method for improving throughput from a processor to a graphics device.

FIG. 2 is a flow diagram of one embodiment of a method for improving throughput from a processor to a graphics device. At step 205, a first postable write transaction request is received from a processor over a host bus. Step 210 indicates that if a posted write buffer is available to receive data associated with the first postable write transaction request, the first postable write transaction request is completed at step 220. Completing the first postable transaction request includes storing the data associated with the postable write transaction request in the posted write buffer and delivering a response to the processor indicating that the transaction has been completed. If at step 210 the posted write buffer is unavailable to receive the data associated with the first postable write transaction request, the host bus is stalled at step 215. One possible mechanism for stalling the host bus is the snoop stall mechanism described above in connection with FIG. 1, although other methods or techniques for delaying the completion of the transaction request are possible. After the host bus is stalled at step 215, a determination is made as to whether a second transaction request has been received over the host bus. If no second transaction request has been received at step 225, a determination is made again as to whether the posted write buffer is available at step 210. If a second transaction request has been received at step 225, a timeout counter is initiated at step 230. If at step 235 the posted write buffer is available, the first postable write transaction request is completed. If the posted write buffer continues to be unavailable, the timeout counter is incremented at step 245.

Although this embodiment discusses a counter that increments in value, other embodiments may use counters that decrement in value. If at step 250 the timeout counter has expired, then at step 255 a retry response to the first postable transaction request is issued to the processor. The retry response indicates to the processor to reissue the first postable write transaction request at a later time. If at step 250 the timeout counter has not expired, another determination is made at step 235 as to whether the posted write buffer is available.

Figure 3:
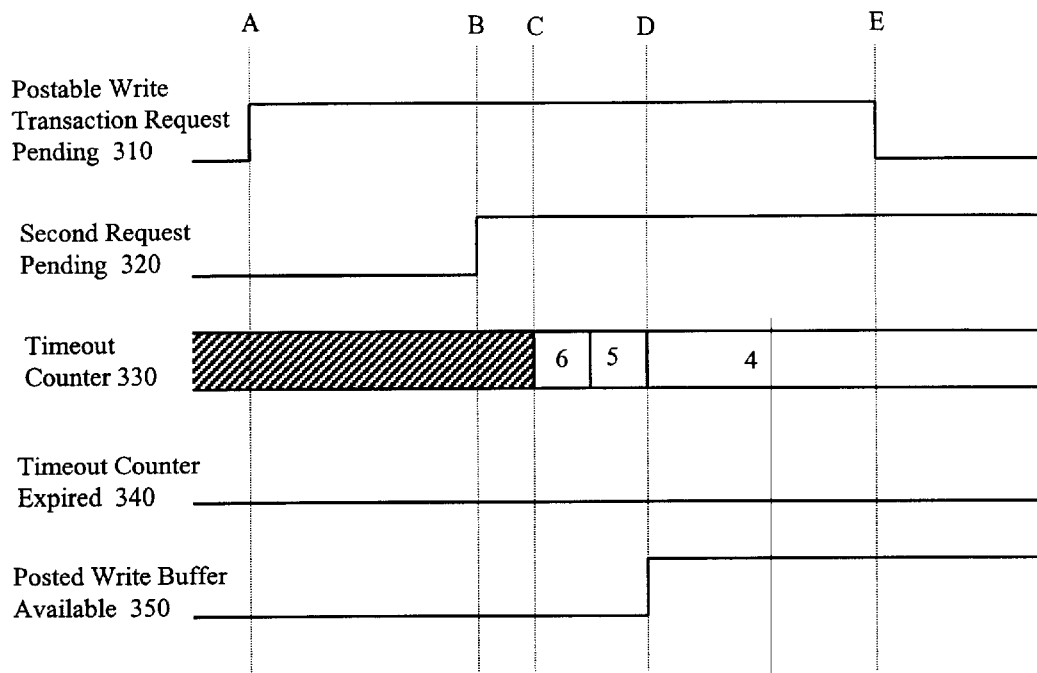
FIG. 3 is a timing diagram, in accordance with one embodiment of a memory controller, illustrating the initiation of a timeout counter when a second transaction request is received and a posted write buffer becomes available before the timeout counter expires.
Figure 4:
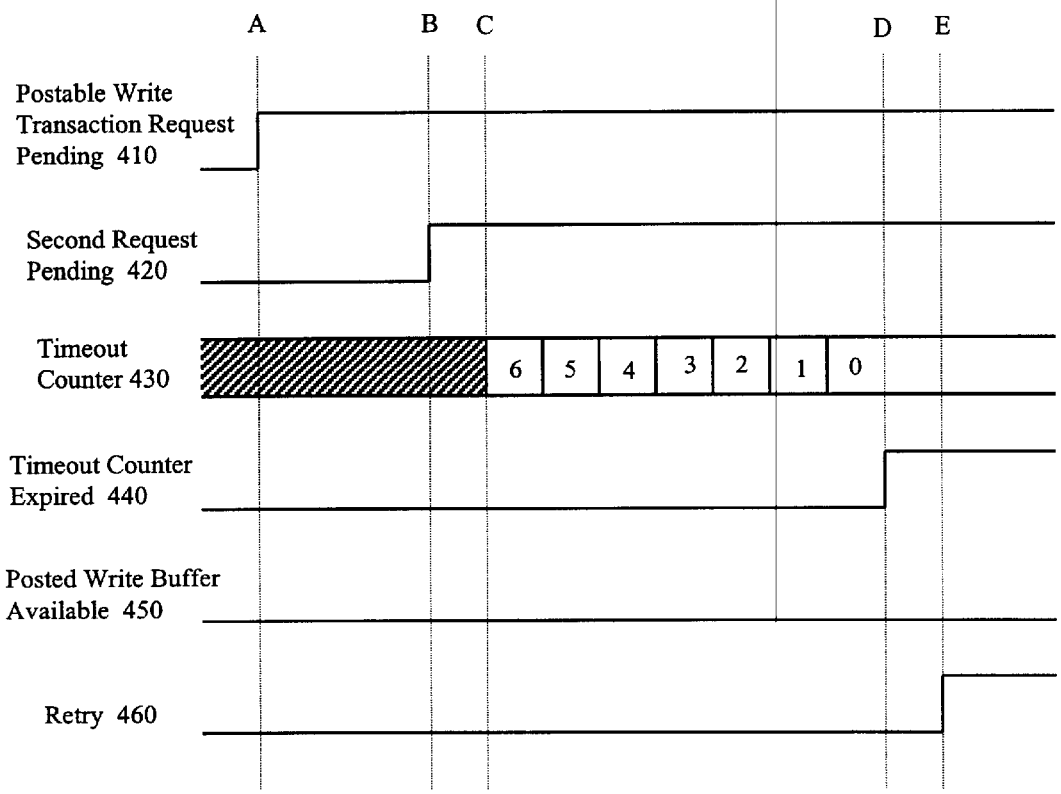
FIG. 4 is a timing diagram, in accordance with one embodiment of a memory controller, illustrating the initiation of a timeout counter when a second transaction request is received, the timeout counter expiring due to continued unavailability of a posted write buffer, and the issuance of a retry response from the memory controller to a processor.

The timing diagrams of FIGS. 3 and 4 are intended to further explain the function of the embodiments described herein and are not intended to describe specific timings. Alternative embodiments may use different timing relationships. Further, the timing diagrams of FIGS. 3 and 4 will be discussed in connection with the system 100 of FIG. 1. Also, the signals described below in connection with FIGS. 3 and 4 are meant to represent any signal or group of signals that indicate the described events when the signals or groups of signals are in particular states.

FIG. 3 is a timing diagram illustrating the initiation of the timeout counter 124 when a second transaction request is received and the posted write buffer 126 becomes available before the timeout counter 124 expires. A postable write transaction request signal 310 becomes asserted at time A, indicating that a first postable write transaction request has been received by the bus interface unit 122 in the memory controller 120. At time A, a posted write buffer available signal 350 is not asserted, indicating that the posted write buffer 126 is not available to receive data associated with the first postable write transaction request. Also note that at time A there is no second transaction request pending, as indicated by a second request pending signal 320. Further, the timeout counter 124 has not been initiated, as indicated by the timeout counter count indicator 330, and a timeout counter expired signal 340 has not been asserted.

At time B, a second transaction request is received by the bus interface unit 122, as indicated by the assertion of the second request pending signal 320. As a result of the assertion of the second request pending signal 320 and the continued non-assertion of the posted write buffer available signal 350, the timeout counter 124 is initiated with a count of 6 at time C. The timeout counter 124 begins counting down from time C until the posted write buffer available signal 350 is asserted at time D, indicating that the posted write buffer 126 is available to receive the data associated with the first postable write transaction request. The timeout counter 124 stops its count down and at point E the postable write transaction request pending signal 310 becomes deasserted, indicating that the first postable write transaction request has completed. After time E, the memory controller will work to complete the second transaction request.

FIG. 4 is a timing diagram illustrating the initiation of the timeout counter 124 when a second transaction request is received, the timeout counter 124 expiring due to continued unavailability of the posted write buffer 126, and the issuance of a retry response from the memory controller 120 to the processor 110. A postable write transaction request signal 410 becomes asserted at time A, indicating that a first postable write transaction request has been received by the bus interface unit 122. At time A, a posted write buffer available signal 450 is not asserted, indicating that the posted write buffer 126 is not available to receive data associated with the first postable write transaction request. Also note that at time A there is no second transaction request pending, as indicated by a second request pending signal 420. Further, the timeout counter 124 has not been initiated, as indicated by the timeout counter count indicator 430, and a timeout counter expired signal 440 has not been asserted.

At time B, a second transaction request is received by the bus interface unit 122, as indicated by the assertion of the second request pending signal 420. As a result of the assertion of the second request pending signal 420 and the continued non-assertion of the posted write buffer available signal 450, the timeout counter 124 is initiated with a count of 6 at time C. The timeout counter 124 begins counting down from time C and continues to count down to zero which causes the timeout counter expired signal 440 to become asserted at time D. The expiration of the timeout counter 124 and the continued non-assertion of the posted write buffer available signal 450 results in the bus interface unit 122 issuing a retry response to the processor 110 for the first postable write transaction request, as indicated by the assertion of the retry signal 460 at time E. Following the retry response, the memory controller 120 will work to complete the pending second transaction request.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a bus interface unit to receive a first postable write transaction request;
   a posted write buffer coupled to the bus interface unit to receive data associated with the first postable write transaction request; and
   a timeout counter coupled to the bus interface unit, the bus interface unit to initiate the timeout counter if the bus interface unit is currently unable to complete the first postable write transaction request due to unavailability of the posted write buffer and if a second transaction request is received, the bus interface unit to issue a retry response to the first posted write transaction request upon an expiration of the timeout counter if the posted write buffer remains unavailable.

2. The apparatus of claim 1, wherein the first postable write transaction request is directed to a graphics device.

3. The apparatus of claim 2 further comprising:
   a graphics bus interface buffer coupled to the posted write buffer to receive the data associated with the first postable write transaction request; and
   a graphics bus interface unit coupled to the graphics bus interface buffer, the graphics bus interface unit to interface to a graphics bus.

4. The apparatus of claim 3 wherein the graphics bus is an Accelerated Graphics Port (AGP) bus.

5. The apparatus of claim 4, the posted write buffer to store three lines of data, each of the three lines of data including 32 bytes of information.

6. The apparatus of claim 5, wherein the timeout counter counts 6 clock periods after initialization before expiring.

7. A system, comprising:
   a processor coupled to a host bus; and
   a memory controller electrically coupled to the host bus, the memory controller including
      a bus interface unit to receive a first postable write transaction request from the processor;
      a posted write buffer coupled to the bus interface unit to receive data associated with the first postable write transaction request; and
      a timeout counter coupled to the bus interface unit, the bus interface unit to initiate the timeout counter if the bus interface unit is currently unable to complete the first postable write transaction request due to unavailability of the posted write buffer and if a second transaction request is received, the bus interface unit to issue a retry response to the first posted write transaction request upon an expiration of the timeout counter if the posted write buffer remains unavailable.

8. The system of claim 7, wherein the first postable write transaction request is directed to a graphics device, the graphics device coupled to the memory controller via a graphics bus.

9. The system of claim 8 wherein the memory controller further includes
- a graphics bus interface buffer coupled to the posted write buffer to receive the data associated with the first postable write transaction request; and
- a graphics bus interface unit coupled to the graphics bus interface buffer, the graphics bus interface unit to couple the memory controller to the graphics bus.

10. The system of claim 9 wherein the graphics bus is an Accelerated Graphics Port (AGP) bus.

11. The system of claim 10, the posted write buffer to store three lines of data, each of the three lines of data including 32 bytes of information.

12. The system of claim 11, wherein the timeout counter counts 6 clock periods after initialization before expiring.

13. A method, comprising:
- receiving a first postable write transaction request, the first postable write transaction request issued by a processor and delivered over a host bus;
- determining whether a posted write buffer is able to receive data associated with the first postable write transaction request;
- stalling the host bus if the posted write buffer is unable to receive the data associated with the first postable write transaction request;
- initiating a timeout counter if a second transaction request is received over the host bus while the posted write buffer is unable to receive the data associated with the first posted write transaction request; and
- issuing a retrying response to the processor for the first postable write transaction request if the timeout counter expires before the posted write buffer becomes able to receive the data associated with the first postable write transaction request.

14. The method of claim 13 further comprising the steps of:
- unstalling the host bus if the posted write buffer becomes available before the timeout counter expires; and
- storing the data associated with the first postable write transaction request in the posted write buffer if the posted write buffer becomes available before the timeout counter expires.

15. The method of claim 14 wherein the step of receiving a first postable write transaction request includes receiving a write transaction request directed to a graphics device.

16. The method of claim 15 further comprising the step of delivering the data associated with the first postable write transaction request to a graphics bus after the data associated with the first postable write transaction request is stored in the posted write buffer.

17. The method of claim 16 wherein the step of delivering the data associated with the first postable write transaction request to a graphics bus includes moving the data associated with the first postable write transaction request from the posted write buffer to a graphics bus interface buffer; and
- outputting the data associated with the first postable write transaction request from the graphics bus interface buffer to an AGP bus.

* * * * *